US011252654B2

(12) United States Patent
Caceres et al.

(10) Patent No.: US 11,252,654 B2
(45) Date of Patent: Feb. 15, 2022

(54) SYSTEMS AND METHODS FOR USER-SPECIFIC SLICE CONFIGURATION FOR AN APPLICATION

(71) Applicant: Verizon Patent and Licensing Inc., Basking Ridge, NJ (US)

(72) Inventors: Manuel Enrique Caceres, Basking Ridge, NJ (US); Umesh Kumar Gupta, Morris Plains, NJ (US); Mauricio Pati Caldeira De Andrada, South Plainfield, NJ (US); Muhammad Salman Nomani, Somerset, NJ (US); Jyotsna Kachroo, Millburn, NJ (US); Jun Yuan, Cranbury, NJ (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 39 days.

(21) Appl. No.: 16/906,453

(22) Filed: Jun. 19, 2020

(65) Prior Publication Data
US 2021/0400572 A1  Dec. 23, 2021

(51) Int. Cl.
*H04W 48/18* (2009.01)
*H04L 29/12* (2006.01)
*H04W 76/11* (2018.01)
*H04W 40/02* (2009.01)

(52) U.S. Cl.
CPC ......... *H04W 48/18* (2013.01); *H04L 61/6054* (2013.01); *H04W 40/02* (2013.01); *H04W 76/11* (2018.02)

(58) Field of Classification Search
CPC ..... H04W 48/18; H04W 40/02; H04W 76/11; H04L 61/6054
See application file for complete search history.

(56) References Cited

U.S. PATENT DOCUMENTS

2021/0168139 A1* 6/2021 Li ..................... H04L 63/0853
2021/0176334 A1* 6/2021 Stockert ............... H04L 9/3239

* cited by examiner

*Primary Examiner* — Marisol Figueroa

(57) ABSTRACT

A device may receive, from a user equipment, a token request associated with an application, wherein the token request is associated with a device identifier. The device may generate a device token for the application and the user equipment. The device may provide, using the device identifier, the device token to the user equipment to enable a user to access the application via an application platform. The device may receive, from the application platform, a slice request for a network slice of a network that is to be used for an application session. The device may determine that the user equipment is associated with the application session based on the device token and the device identifier. The device may configure a network slice instance of the network slice. The device may determine a user equipment route selection policy for the application session according to the network slice instance.

20 Claims, 8 Drawing Sheets

SYSTEMS AND METHODS FOR USER-SPECIFIC SLICE CONFIGURATION FOR AN APPLICATION

BACKGROUND

5G/New Radio (5G/NR) provides various enhancements to wireless communications, such as flexible bandwidth allocation, improved spectral efficiency, ultra-reliable low-latency communications (URLLC), beamforming, high-frequency communication (e.g., millimeter wave (mmWave)), virtual network slicing, and/or the like.

DETAILED DESCRIPTION OF PREFERRED EMBODIMENTS

Figure 1A:
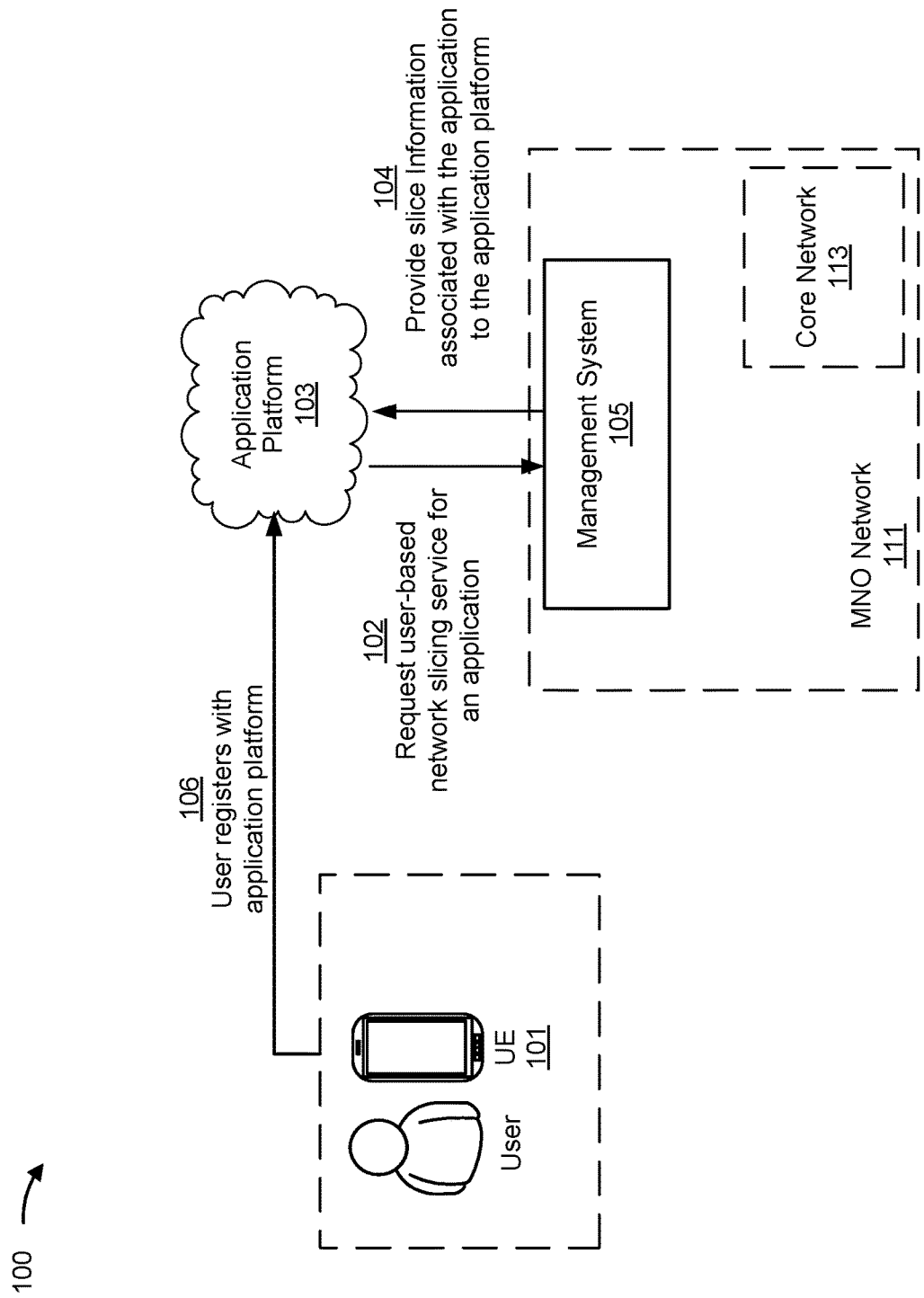
FIGS. 1A-1D are diagrams of one or more example implementations described herein.

The following detailed description of example implementations refers to the accompanying drawings. The same reference numbers in different drawings may identify the same or similar elements.

In a wireless telecommunications system, such as a 5G wireless telecommunications network, network slicing allows for multiple virtual networks to run on a single physical network. Each virtual network (e.g., network slice) may be configured to provide a different quality of service and a different end-to-end communication path to enable the wireless telecommunication system to support multiple services, applications, and/or entities.

When a user equipment (UE) is to establish a connection (e.g., protocol data unit (PDU) connectivity) to the wireless telecommunication system to access an application and/or service, the UE may provide the wireless telecommunication system with information associated with the UE, the application, and/or the service (e.g., a single-network slice selection assistance information (S-NSSAI)). The information may permit a network slice selection function (NSSF) of the wireless telecommunication system to select a network slice instance (NSI) (e.g., a virtual network of network functions (NFs) and other resources to support one or more S-NSSAIs) according to a network slice configuration associated with the S-NSSAI (e.g., a network slice configuration that can provide the service as defined by the S-NSSAI).

The network slice configuration may be defined according to a fixed slice description associated with the UE, the application, and/or the service. In this way, the wireless telecommunication system may allocate different types of network slices (e.g., network slices providing different qualities or levels of service) based on the UE, the application, and/or the service. In some situations, users of an application may have subscribed to different levels of service (e.g., different amounts of bandwidth, different priorities, and/or the like).

Some implementations described herein relate to a system that enables different types of network slices to be used by different users to access an application and/or service independent of a UE used by the users to access the application and/or service. For example, an entity may utilize a wireless telecommunication system to provide an application and/or service to a group of users. To access the application and/or service, a user may open an application executing on a UE associated with the user. The application may obtain a token associated with the application based on the user opening the application. The token may include information that enables a network device included in the wireless telecommunication system to identify the UE and/or the application.

The application may provide the token and information identifying the user to the entity (e.g., a network device associated with the entity). The application platform may determine a type of network slice to be utilized by the user to access the application and/or service based on the information identifying the user. The application platform may provide the token and information identifying the determined type of network slice to a network device included in the wireless telecommunication network to cause the network device to allocate the type of network slice to the UE to enable the user to access the application and/or service.

In this way, a network may perform automated user-based network slicing. User-based network slicing may enable the network to provide different levels of service to different users that are utilizing the same UE (e.g., at different times) to access an application and/or service provided by the network.

As an example, a first user may utilize a UE to access the application and/or service. The application platform may identify the first user based on the token and may determine a first level of service associated with the first user. The application platform may determine a first type of network slice for providing the first level of service to the first user. The application platform may provide the token and information identifying the first type of network slice to the network device to cause the network device to allocate the first type of network slice to the UE to enable the first user to be provided the first level of service when accessing the application and/or service.

Subsequently, a second user may utilize the same UE to access the application and/or service. The application platform may identify the second user based on the token and may determine a second level of service associated with the second user. The application platform may determine a second type of network slice for providing the second level of service to the second user. The application platform may provide the token and information identifying the second type of network slice to the network device to cause the network device to allocate the second type of network slice to the UE to enable the second user to be provided the second level of service when accessing the application and/or service.

Additionally, because the application platform determines the type of network slice based on the identity of the user, rather than based on the UE utilized by the user, the application platform may enable a user to be provided the same quality of service regardless of the UE utilized to access the application.

Further, because the network slice is allocated based on a particular user accessing the application and/or service, rather than based on the UE utilized by the user to access the application and/or service, the UE does not have to be pre-configured for a specific network slice thereby conserving computing resources (e.g., processing resource, memory resources, communication resources, and/or the like).

FIGS. 1A-1D are diagrams of one or more example implementations 100 described herein. As shown in FIGS. 1A-1D, a mobile network operator (MNO) network 111 (e.g., a cellular network) provides a user-based network slicing service that enables an application platform 103 to determine a type of network slice to be allocated to a user equipment (UE) 101 based on the identity of a user associated with the UE 101.

The application platform 103 may utilize the MNO network 111 to provide an application to a group of users (e.g., subscribers, customers, employees, and/or the like). As shown in FIG. 1A, and by reference number 102, the application platform 103 requests a user-based slicing service for an application. The application platform 103 may request the user-based slicing service to provide different levels of service (e.g., different amounts of bandwidth, different priorities, and/or the like) to different users based on an identity of the user.

A management system 105 of the MNO network 111 may receive the request and may provide information to the application platform 103 to enable the application platform 103 to utilize the user-based slicing service. The management system 105 may determine a plurality of levels of service associated with the application platform 103. The management system 105 may determine slice information associated with the plurality of levels of service. The slice information associated with a level of service may include information identifying a type of network slice (e.g., a slice identifier) associated with the level of service.

As shown by reference number 104, the management system 105 provides the slice information associated with the application to the application platform. The application platform 103 may receive the slice information and may utilize the slice information to provide different levels of service to users accessing the application based on an identity of the user, as described below.

As shown by reference number 106, a user utilizes the UE 101 to register with the application platform 103. For example, the user may utilize the UE 101 to establish an account with the application platform 103, by providing user information (e.g., information identifying a name of the user, an address of the user, a position of the user within an organization, and/or the like) to the application platform 103. The application platform 103 may receive the user information and may establish the account for the user based on the user information.

Figure 1B:
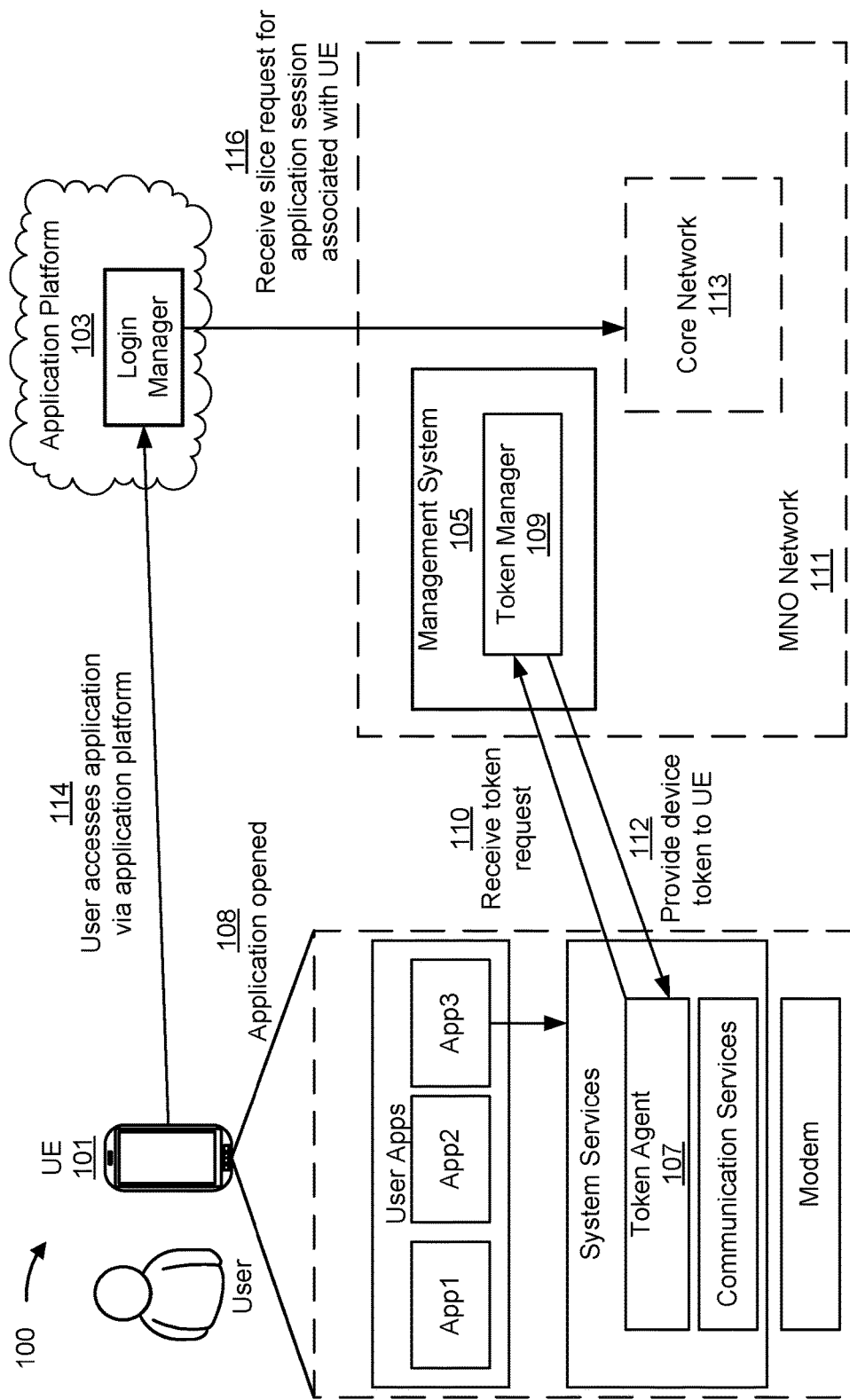

As shown in FIG. 1B, and by reference number 108, a user may interact with the UE 101 to open an application (e.g., App3, as shown in FIG. 1B) associated with the application platform 103. The UE 101 may execute the application based on the user utilizing the UE 101 to open the application. The application may request a device token from a token agent 107 associated with the UE 101 based on the UE 101 executing the application. For example, the application may call an application programming interface (API) exposed by code available in the UE 101 from the MNO. In some implementations, the token agent 107 is included in a subscriber identity module (SIM) of the UE 101. In some implementations, the token agent 107 is included in a different device, such as the application platform 103.

The token agent 107 may receive the request from the application and may determine whether the application is authorized to request the device token. The token agent 107 may access a data structure (e.g., a database, a list, a table, and/or the like) (not shown) storing information identifying applications and/or users authorized to request a device token. The token agent 107 may determine whether the application is authorized to request the device token based on the information stored in the data structure.

In some implementations, the token agent 107 determines that the application is not authorized to request the device token. For example, the token agent 107 may determine that the application is not authorized to request the device token based on the data structure not including information identifying the application and/or the user.

In these implementations, the token agent 107 may provide a response denying the request to the application. The application may receive the response and may perform one or more actions based on the response, such as providing a notification to the user, re-requesting the device token from the token agent 107, utilizing a set of default settings to access the application platform 103, and/or the like.

In some implementations, the token agent 107 determines that the application is authorized to request the device token. For example, the token agent 107 may determine that the application is authorized to request the device token based on the data structure including information identifying the application and/or the user.

The token agent 107 may generate a token request based on determining that the application is authorized to request the device token. The token request may include information identifying a device identifier associated with the UE 101 (e.g., a mobile station international subscriber directory number (MSISDN), an international mobile subscriber identity (IMSI), an international mobile equipment identity (IMEI), and/or the like) and an application identifier that uniquely identifies the application within the MNO network 111. In some implementations, the application identifier is computed by an operating system of the UE 101. The operating system may compute the application identifier based on an application name associated with the application, an application signing certificate associated with the application, and/or the like.

In some implementations, the token agent 107 generates the token request based on verifying that the UE 101 is associated with a valid SIM associated with the MNO. For example, the token agent 107 may verify that the UE 101 is associated with a valid SIM associated with the MNO based on performing an extensible authentication protocol—authentication key agreement (EAP-AKA) procedure. The token agent 107 may generate the token request and/or may provide the token request to a token manager 109 associated with the management system 105 based on verifying that the UE 101 is associated with a valid SIM.

As shown by reference number 110, the token manager 109 receives the token request from the UE 101. The token manager 109 may generate the device token for the application based on the request. The token manager 109 may determine the device identifier and the application identifier based on the token request. The token manager 109 may determine a user associated with the UE 101 based on the device identifier. For example, the token manager 109 may access a data structure storing information associating device identifiers with users. The token manager 109 may determine the user associated with the UE 101 based on the information stored in the data structure.

In some implementations, the token manager 109 may determine that the user is authorized to utilize a particular type of network slice to access the application based on the application identifier. For example, the token manager 109 may access a data structure storing user information associated with the user. The user information may include information indicating a particular type of a network slice that the user may utilize to access the application. The token manager 109 may generate the device token based on the user information. The device token may enable the user to utilize the particular type of the network slice to access the application, as described below.

The token manager 109 may generate the device token based on a token string. The token string may include the application identifier and/or information identifying the UE 101 (e.g., the MSISDN, the IMSI, the IMEI, and/or the like). The token manager 109 may store information associating the token string with the application identifier and/or the information identifying the UE 101 in a data structure stored in a memory associated with the token manager 109.

As shown by reference number 112, the token manager 109 provides the device token to the UE 101. The token agent 107 may receive the device token from the token manager 109. The token agent 107 may provide the device token to the application to enable the user to access the application via the application platform 103.

As shown by reference number 114, the user utilizes the UE 101 to access the application via the application platform 103. For example, the user may utilize the UE 101 to log in to the application via the application platform 103. The user may input authorization credentials (e.g., a username, a password, and/or the like) via a user interface provided by the application. The application may receive the authorization credentials and may provide the authorization credentials and the device token to the application platform 103.

The application platform 103 may receive the authorization credentials and may utilize the authorization credentials to authenticate the user. The application platform 103 may determine an identity of the user based on authenticating the user. The application platform 103 may identify a user profile associated with the authorization credentials and may determine the identity of the user based on the user profile.

The application platform 103 may select a type of a network slice, from a plurality of types of network slices, to be utilized to access the application based on an identity of the user. A type of network slice may be associated with a quality of service (e.g., bandwidth, latency, priority, and/or the like) provided by the MNO network 111. The application platform 103 may determine a quality of service associated with the user and may select a type of a network slice associated with the quality of service.

By utilizing the application platform 103 to select the type of the network slice based on the identity of the user (e.g., rather than based on the UE utilized to access the application), an entity associated with the application platform 103 may provide different levels of service to different users regardless of the device utilized by the user to access the application. Further, because the selection is made by the application platform 103, the entity is able to quickly and efficiently modify the level of service provided to a particular user.

In some implementations, the application platform 103 may determine the quality of service based on information included in the user profile. The user profile may include information indicating a position of the user within an organization (e.g., president, executive, administrative personnel, engineer, and/or the like), information indicating a job or function performed by the user, and/or the like. The application platform 103 may determine a quality of service associated with the position of the user, the job or function performed the user, and/or the like. The application platform 103 may determine the quality of service based on the quality of service being associated with the position of the user, the job or function performed by the user, and/or the like.

Alternatively, and/or additionally, the application platform 103 may determine the quality of service based on a type of a subscription associated with the user. The application platform 103 may offer users various types of subscriptions (e.g., a premium subscription service, a basic subscription service, and/or the like) associated with utilizing the application. The application platform 103 may determine a type of subscription associated with the user and may determine the quality of service based on the type of subscription associated with the user.

The application platform 103 may generate a slice request associated with the type of network slice for an application session associated with the UE 101. The slice request may include information identifying the application (e.g., the application identifier), the device token, information identifying the type of network slice (e.g., a slice identifier), and information identifying the user (e.g., a user identifier). The application platform 103 may provide the slice request to a network device included in a core network 113 associated with the MNO network 111. For example, the application platform 103 may provide the slice request to a network exposure function (NEF) device included in the core network 113.

As shown by reference number 116, the core network 113 receives the slice request for the application session associated with the UE 101. The core network 113 may utilize the device token to identify the UE 101 associated with the application session. The core network 113 may obtain the device token from the request and may provide the device token to the token manager 109 to obtain information identifying the UE 101 associated with the slice request.

Figure 1C:
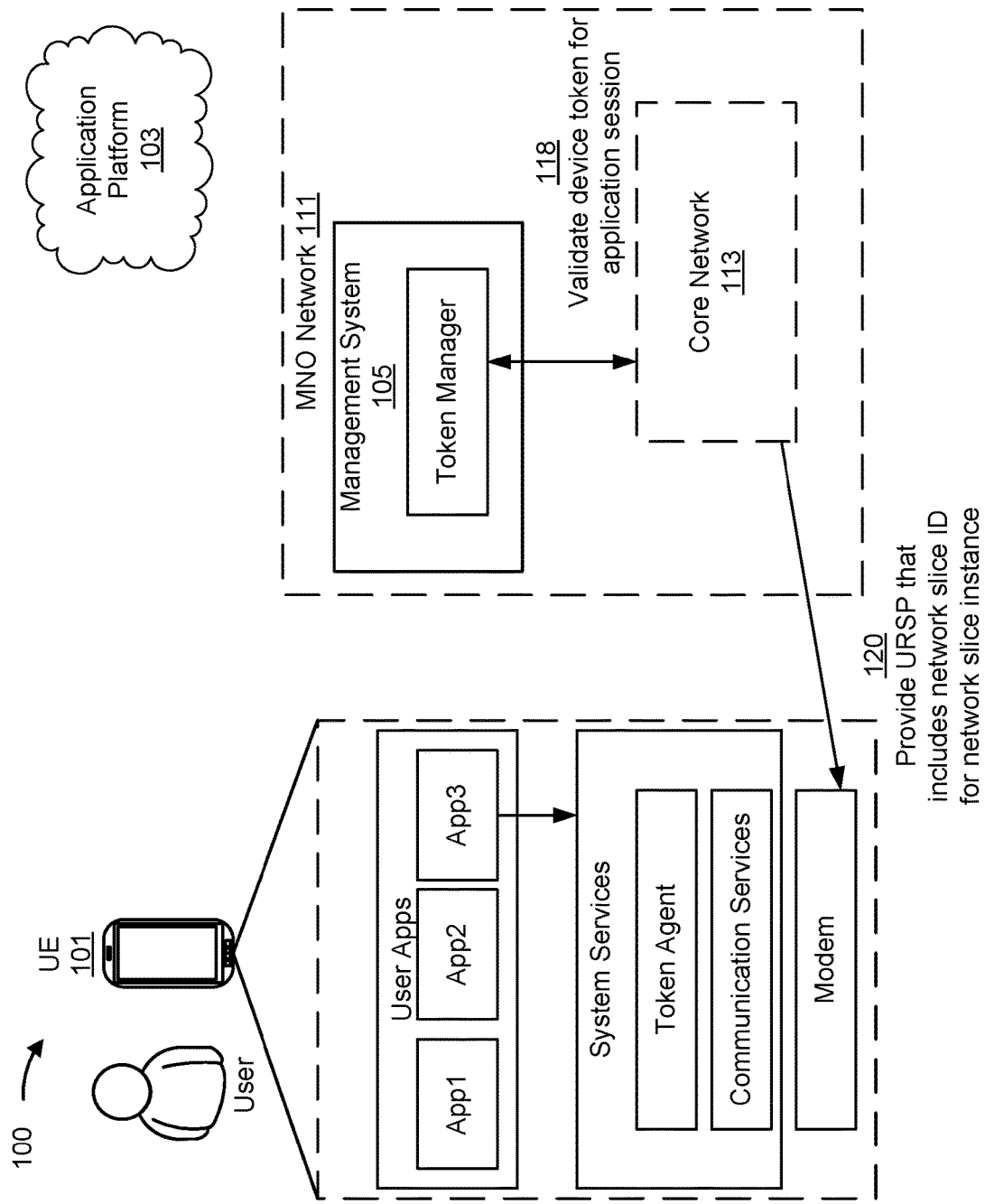

The token manager 109 may receive the device token from the core network 113. As shown in FIG. 1C, and by reference number 118, the token manager 109 validates the device token for the application session. For example, the token manager 109 may validate the device token for the application session based on the token string. The token manager 109 may extract the token string from the device token and may determine that the token string is associated with a valid device token. The token manager 109 may utilize the token string to obtain information identifying the UE 101 based on the token string being associated with a valid device token. For example, the token manager 109 may utilize the device token to obtain information identifying the UE 101 from a data structure storing the information identifying the UE 101.

The token manager 109 may provide the information identifying the UE 101 to the core network 113 based on validating the device token for the application session. The core network 113 may receive the information identifying the UE 101 and may determine a UE route selection policy (URSP) rule associated with the slice identifier included in the slice request. The URSP rule may include the application identifier and information identifying a network slice identifier associated with a network slice instance corresponding to the type of network slice associated with the slice identifier included in the slice request.

As shown by reference number 120, the core network 113 provides the URSP rule that includes the network slice identifier for the network slice instance to the UE 101. The UE 101 may receive the URSP rule and may store the URSP rule in a memory of the UE 101.

The application may determine that the UE 101 received the URSP rule and may provide a PDU session request for establishing a PDU session associated with the application to the operating system of the UE 101. For example, the operating system may provide a notification to the application indicating that the UE 101 received the URSP rule and the application may provide the PDU session request to the operating system based on receiving the notification. The operating system may receive the PDU session request and may provide the PDU session request and the application identifier associated with the application to a modem of the UE 101.

Figure 1D:
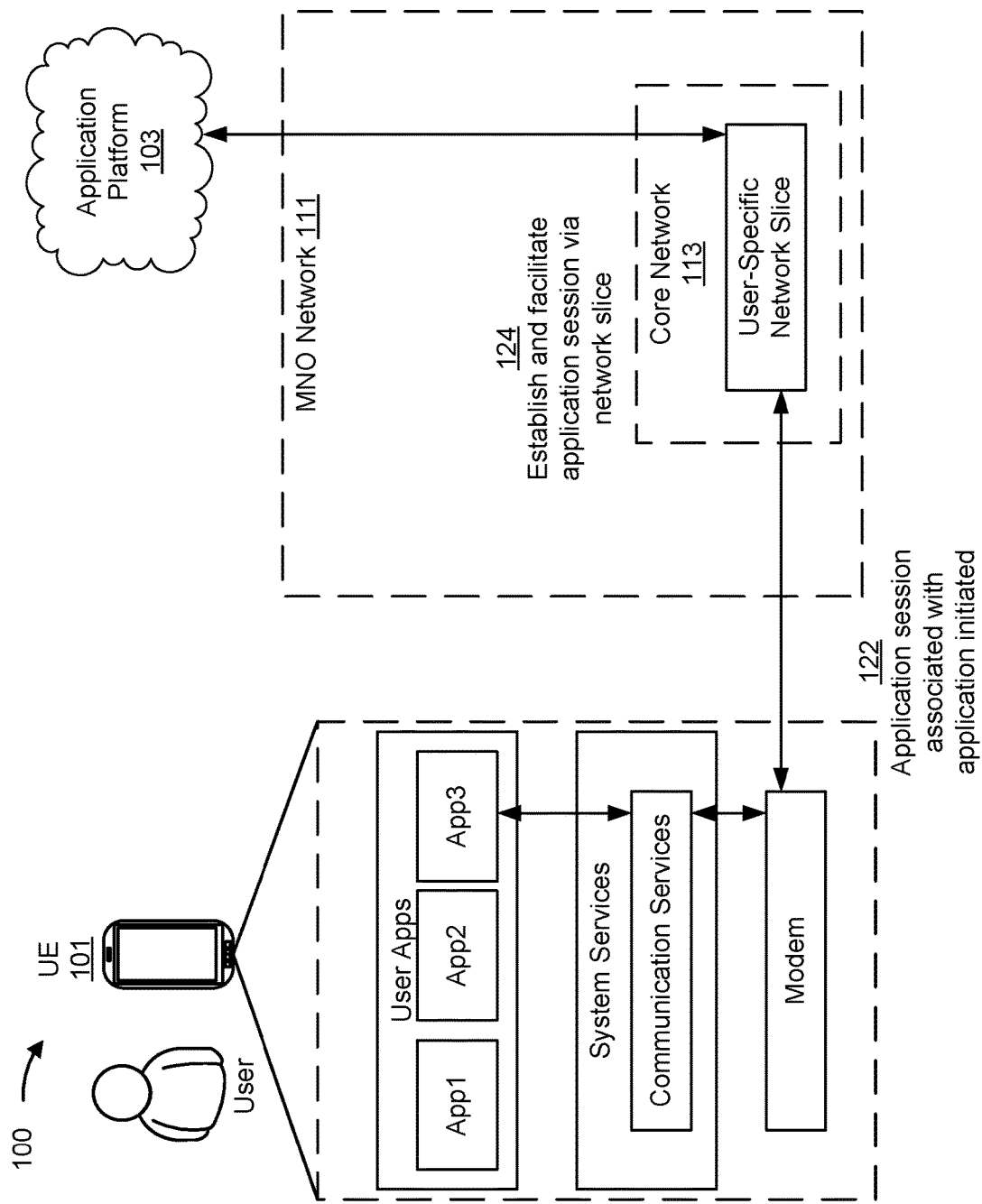

As shown in FIG. 1D, and by reference number 122, an application session associated with the application is initiated. The application session associated with the application (e.g., the PDU session) may be initiated based on the modem receiving the PDU session request and the identifier from the operating system. The modem may determine whether a USRP rule that includes the application identifier is stored in the memory associated with the UE 101.

In some implementations, the modem determines that the USRP rule that includes the application identifier is stored in the memory. In these implementations, the modem initiates the PDU session by transmitting a request to the MNO network 111 to establish a PDU session for the application based on the slice identifier included in the USRP rule.

In some implementations, the modem determines that a USRP rule that includes the application identifier is not stored in the memory. In these implementations, the modem initiates the PDU session by transmitting a request to the MNO network 111 to establish the PDU session based on a default slice identifier associated with a default type of network slice.

As shown by reference number 124, the core network 113 establishes and facilitates an application session via the network slice. The core network 113 may establish and facilitate the PDU session via a network slice associated with the slice identifier included in the request transmitted by the modem. The core network 113 may determine a type of network slice associated with the PDU session based on the application identifier. The core network 113 may allocate a network slice corresponding to the type of network slice for conducting the PDU session. The core network 113 may establish the PDU session for the application based on allocating the network slice.

In this way, a network may perform automated user-based network slicing. User-based network slicing may enable the network to provide different levels of service to different users that are utilizing the same UE 101 (e.g., at different times) to access an application and/or service provided by the network. Additionally, user-based network slicing may enable a user to be provided the same quality of service regardless of the UE 101 utilized to access the application.

Further, because the network slice is allocated based on a particular user accessing the application, rather than based on a UE utilized by the user to access the application, the UE does not have to be pre-configured for a specific network slice thereby conserving computing resources (e.g., processing resource, memory resources, communication resources, and/or the like).

As indicated above, FIGS. 1A-1D are provided as an example. Other examples may differ from what is described with regard to FIGS. 1A-1D. The number and arrangement of devices shown in FIGS. 1A-1D are provided as an example. In practice, there may be additional devices, fewer devices, different devices, or differently arranged devices than those shown in FIGS. 1A-1D. Furthermore, two or more devices shown in FIGS. 1A-1D may be implemented within a single device, or a single device shown in FIGS. 1A-1D may be implemented as multiple, distributed devices. Additionally, or alternatively, a set of devices (e.g., one or more devices) shown in FIGS. 1A-1D may perform one or more functions described as being performed by another set of devices shown in FIGS. 1A-1D.

Figure 2:
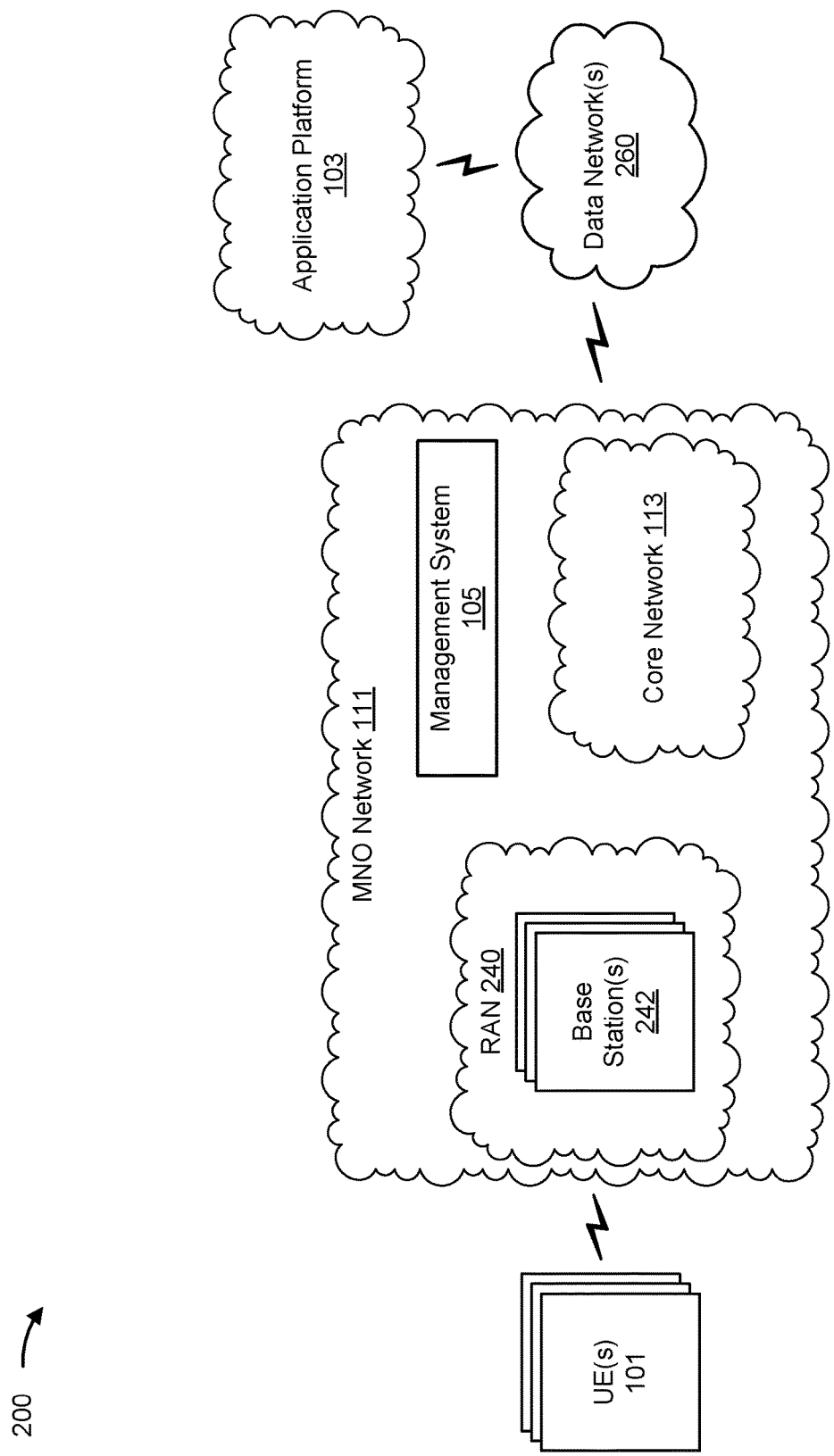
FIG. 2 is a diagram of an example environment in which systems and/or methods described herein may be implemented.

FIG. 2 is a diagram of an example environment 200 in which systems and/or methods described herein may be implemented. As shown in FIG. 2, environment 200 may include one or more UEs 101 (referred to herein individually as UE 101 or collectively as UEs 101), a MNO network 111, a management system 105, a RAN 240, one or more base stations 242 (referred to herein individually as base station 242 or collectively as base stations 242), a core network 113, a data network 260, and an application platform 103. Devices of environment 200 may interconnect via wired connections, wireless connections, optical connection or a combination of wired, optical and wireless connections.

UE 101 includes one or more devices capable of receiving, generating, storing, processing, and/or providing information associated with accessing an application associated with an application platform 103, as described elsewhere herein. UE 101 may include a communication device and/or a computing device. For example, UE 101 may include a wireless communication device, a user equipment (UE), a mobile phone (e.g., a smart phone or a cell phone, among other examples), a laptop computer, a tablet computer, a handheld computer, a desktop computer, a gaming device, a wearable communication device (e.g., a smart wristwatch or a pair of smart eyeglasses, among other examples), an Internet of Things (IoT) device, or a similar type of device. UE 101 may communicate with one or more other devices of environment 200, as described elsewhere herein.

MNO network 111 includes one or more wired, optical and/or wireless networks. For example, MNO network 111 may include a cellular network (e.g., a fifth generation (5G) network, a fourth generation (4G) network, a long-term evolution (LTE) network, a third generation (3G) network, a code division multiple access (CDMA) network, etc.), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, and/or the like, and/or a combination of these or other types of networks. MNO network 111 enables communication among the devices of environment 200.

Management system 105 includes one or more devices, components, or functions to manage MNO network 111. For example, management system 105 may include one or more devices, components, or functions for NSI deployment, NFV, NFVI resource management, SDD management, network orchestration, virtualized infrastructure management, and/or the like. In some implementations, management system 105 includes a NSMF/NSSMF and/or an NFV MANO. Additionally, or alternatively, management system 105 may maintain a VNF catalogue (e.g., of available VNFs of core network 113) and/or a network slice catalogue (e.g., an NSI run-time table and/or the like), and an SDD catalogue of SDDs for use in deploying NSIs, as described herein.

RAN 240 can include a base station and be operatively connected, via a wired and/or wireless connection, to the core network 113. RAN 240 can facilitate communication sessions between UEs 101 and data network 260 by communicating application-specific data between RAN 240 and core network 113. As described herein, data network 260 can include various types of data networks, such as the Internet, a third-party services network, an operator services network, a private network, a wide area network, and/or the like.

Base station 242 includes one or more devices capable of communicating with UE 101 using a cellular Radio Access Technology (RAT). For example, base station 242 may include a base transceiver station, a radio base station, a node B, an evolved node B (eNB), a gNB, a base station subsystem, a cellular site, a cellular tower (e.g., a cell phone tower, a mobile phone tower, etc.), an access point, a transmit receive point (TRP), a radio access node, a macrocell base station, a microcell base station, a picocell base station, a femtocell base station, or a similar type of device. Base station 242 may transfer traffic between UE 101 (e.g., using a cellular RAT), other base stations 242 (e.g., using a wireless interface or a backhaul interface, such as a wired backhaul interface), and/or data network 260. Base station 242 may provide one or more cells that cover geographic areas. Some base stations 242 may be mobile base stations. Some base stations 242 may be capable of communicating using multiple RATs.

In some implementations, base station 242 may perform scheduling and/or resource management for UEs 101 covered by base station 242 (e.g., UEs 101 covered by a cell provided by base station 242). In some implementations, base stations 242 may be controlled or coordinated by a network controller, which may perform load balancing, network-level configuration, and/or the like. The network controller may communicate with base stations 242 via a wireless or wireline backhaul. In some implementations, base station 242 may include a network controller, a self-organizing network (SON) module or component, or a similar module or component. In other words, a base station 242 may perform network control, scheduling, and/or network management functions (e.g., for other base stations 242 and/or for uplink, downlink, and/or side link communications of UEs 101 covered by the base station 242). In some implementations, base station 242 may include a central unit and multiple distributed units. The central unit may coordinate access control and communication with regard to the multiple distributed units. The multiple distributed units may provide UEs 101 and/or other base stations 242 with access to data network 260.

Core network 113 may include various types of core network architectures, such as a 5G core network (e.g., core network 300 of FIG. 3), an LTE EPC, and/or the like. In some implementations, core network 113 may be implemented on physical devices, such as gateways, mobility management entities, and/or the like. In some implementations, the hardware and/or software implementing core network 113 can be virtualized (e.g., through the use of NFV and/or software-defined networking), thereby allowing for the use of composable infrastructure when implementing core network 113. In this way, networking, storage, and compute resources can be allocated to implement the functions of core network 113 in a flexible manner as opposed to relying on dedicated hardware and software to implement these functions. Core network 113 may be managed by management system 105.

Data network 260 includes one or more wired, optical and/or wireless data networks. For example, data network 260 can include an IP Multimedia Subsystem (IMS), a public land mobile network (PLMN), a local area network (LAN), a wide area network (WAN), a metropolitan area network (MAN), a private network such as a corporate intranet, an ad hoc network, the Internet, a fiber optic-based network, a cloud computing network, a third party services network, an operator services network, and/or the like, and/or a combination of these or other types of networks.

Application platform 103 includes one or more devices capable of receiving, generating, storing, processing, providing, and/or routing information associated with determining a type of network slice to be utilized by a user to access an application or service, as described elsewhere herein. Application platform 103 may include a communication device and/or a computing device. For example, application platform 103 may include a server, an application server, a client server, a web server, a database server, a host server, a proxy server, a virtual server (e.g., executing on computing hardware), a server in a cloud computing system, a device that includes computing hardware used in a cloud computing environment, or a similar type of device. Application platform 103 may communicate with one or more other devices of environment 200, as described elsewhere herein.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
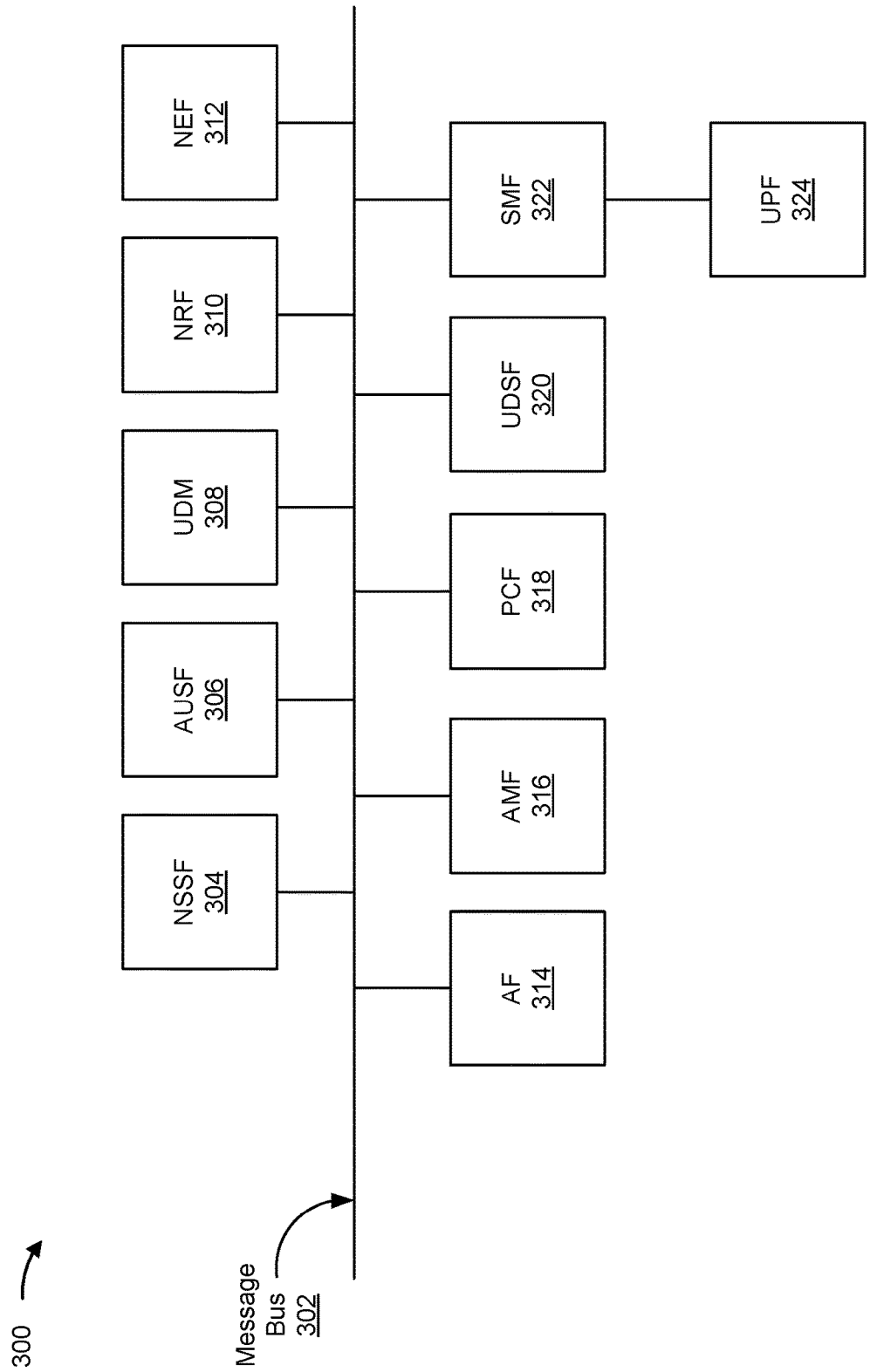
FIG. 3 is a diagram of example components of one or more devices of FIG. 2.

As shown in FIG. 3, core network 300 may include a number (or quantity) of functional elements. The functional elements of core network 300 may communicate via a message bus 302. As shown in FIG. 3, the functional elements may include, for example, a network slice selection function (NSSF) 304, an authentication server function (AUSF) 306, a unified data management (UDM) function 308, an NF repository function (NRF) 310, a network exposure function (NEF) 312, an application function (AF) 314, an access and mobility management function (AMF) 316, a policy control function (PCF) 318, an unstructured data storage function (UDSF) 320, a session management function (SMF) 322, a user plane function (UPF) 324, and/or the like.

Each of the functional elements shown in FIG. 3 is implemented on one or more devices associated with a wireless telecommunications system. In some implementations, one or more of the functional elements may be implemented on physical devices, such as an access point, a base station, a gateway, and/or the like. In some implementations, one or more of the functional elements may be implemented on a computing device of a cloud computing environment.

NSSF 304 is a hardware-based element that may select NSIs for UEs (and/or may determine network slice policies to be applied at a RAN). By providing network slicing, NSSF 304 allows an operator to deploy multiple substantially independent end-to-end networks potentially with the same infrastructure. NSSF 304 may correspond to the NSSF of example implementation 100. In some implementations, each slice may be customized for different services.

AUSF 306 is a hardware-based element that may act as an authentication server and support the process of authenticating UEs in the wireless telecommunications system. UDM 308 can store subscriber data and profiles in the wireless telecommunications system. UDM 308 can be used for fixed access, mobile access, and/or the like, in core network 113.

NRF 310 is a hardware-based element that may interface with NEF 312 to provide AMF 316 with group messages. NRF 310 may enable the functional elements of core network 300 to discover and communicate with one another via message bus 326. NEF 312 is a hardware-based element that may support the exposure of capabilities and/or events in the wireless telecommunications system to help other entities in the wireless telecommunications system discover network services. For example, NEF 312 may support the exposure of group messages that may be provided via a group messaging service.

AF 314 may be a hardware-based element that may support application influence on traffic routing, access to NEF 312, policy control, and/or the like. In some implementations, AMF 316 may be a hardware-based element that may act as a termination point for Non-Access Stratum (NAS) signaling, mobility management, and/or the like. AMF 316 can provide authentication and authorization of UEs and mobility management (e.g., provisioning UEs to use NSIs associated with SDDs as described herein). PCF 318 can provide a policy framework that incorporates network slicing, roaming, packet processing, mobility management, and/or the like.

UDSF 320 includes one or more data structures configured to store information, mappings, and/or the like associated with the core network 300. For example, UDSF 320 may include one or more tables, mappings, graphs, and/or the like of resources, NSIs, SDDs, and/or the like, as described herein.

SMF 322 may be a hardware-based element that may support the establishment, modification, and release of communication sessions in the wireless telecommunications system. For example, SMF 322 may configure traffic steering policies at UPF 324, enforce UE IP address allocation and policies, and/or the like. SMF 322 can support the establishment, modification, and release of communication sessions in the wireless telecommunications system. For example, SMF 322 can configure traffic steering policies at UPF 324, enforce UE IP address allocation and policies, and/or the like. AMF 316 and SMF 322 can act as a termination point for Non-Access Stratum (NAS) signaling, mobility management, and/or the like. SMF 322 can act as a termination point for session management related to NAS. RAN 240 can send information (e.g., the information that identifies the UE) to AMF 316 and/or SMF 322 via PCF 318.

UPF 324 is a hardware-based element that may serve as an anchor point for intra/inter-RAT mobility. UPF 324 may apply rules to packets, such as rules pertaining to packet routing, traffic reporting, handling user plane QoS, and/or the like. Message bus 326 represents a communication structure for communication among the functional elements. In other words, message bus 326 may permit communication between two or more functional elements of core network 300.

The number and arrangement of functional elements shown in FIG. 3 are provided as an example. In practice, there may be additional functional elements, fewer functional elements, different functional elements, or differently arranged functional elements than those shown in FIG. 3. Furthermore, two or more functional elements shown in FIG. 3 may be implemented within a single device, or a single functional element shown in FIG. 3 may be implemented as multiple, distributed devices. Additionally, or alternatively, a set of functional elements (e.g., one or more functional elements) of core network 300 may perform one or more functions described as being performed by another set of functional elements of core network 300.

Figure 4:
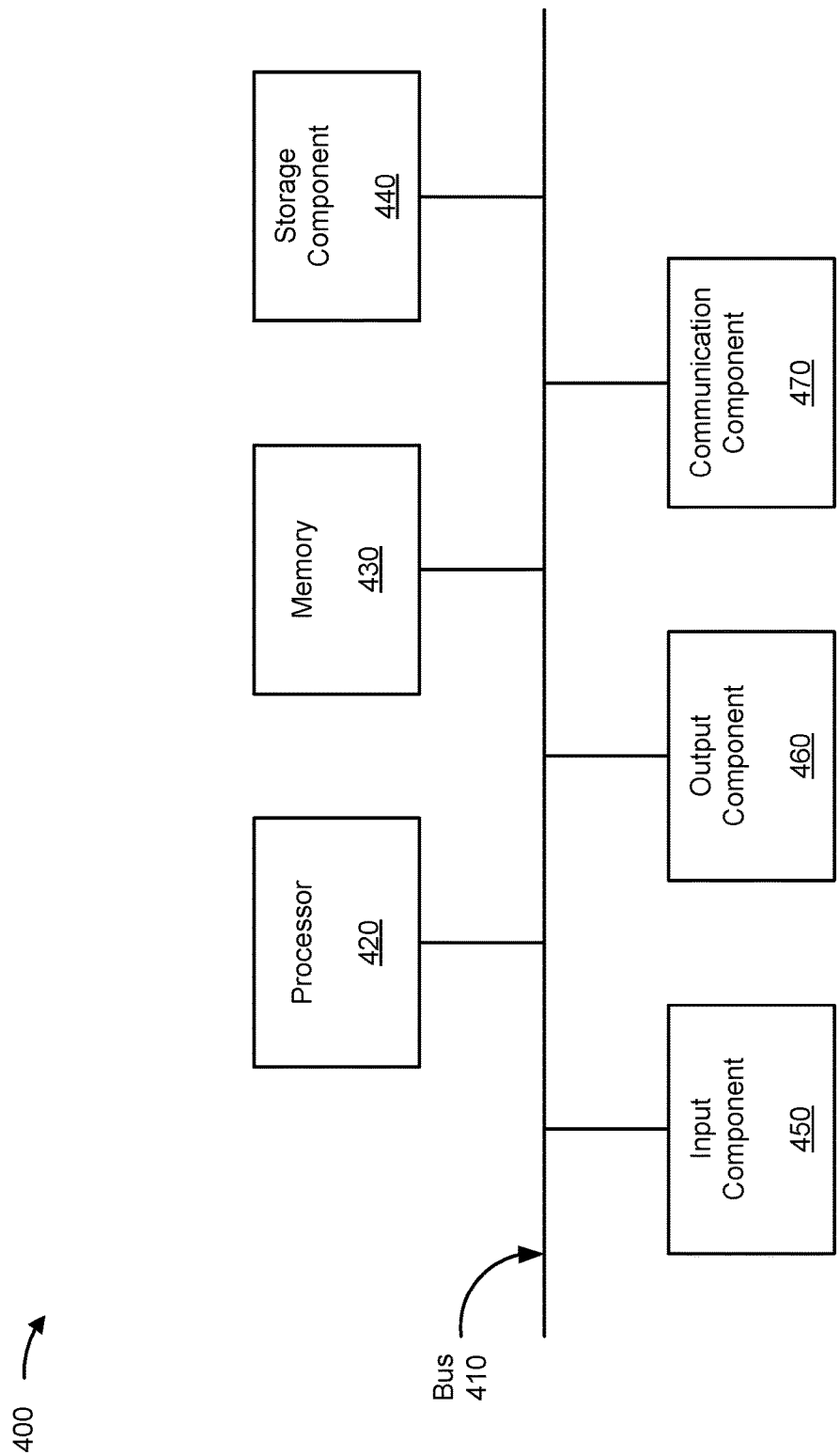
FIG. 4 is a diagram of example components of one or more devices of FIG. 3.

FIG. 4 is a diagram of example components of a device 400, which may correspond to UE 101, application platform 103, management system 105, base station 242, NSSF 304, AUSF 306, UDM 308, NRF 310, NEF 312, AF 314, AMF 316, PCF 318, UDSF 320, SMF 322, and/or UPF 324. In some implementations, UE 101, application platform 103, management system 105, base station 242, NSSF 304, AUSF 306, UDM 308, NRF 310, NEF 312, AF 314, AMF 316, PCF 318, UDSF 320, SMF 322, and/or UPF 324 may include one or more devices 400 and/or one or more components of device 400. As shown in FIG. 4, device 400 may include a bus 410, a processor 420, a memory 430, a storage component 440, an input component 450, an output component 460, and a communication component 470.

Bus 410 includes a component that enables wired and/or wireless communication among the components of device 400. Processor 420 includes a central processing unit, a graphics processing unit, a microprocessor, a controller, a microcontroller, a digital signal processor, a field-programmable gate array, an application-specific integrated circuit, and/or another type of processing component. Processor 420 is implemented in hardware, firmware, or a combination of hardware and software. In some implementations, processor 420 includes one or more processors capable of being programmed to perform a function. Memory 430 includes a random access memory), a read only memory, and/or another type of memory (e.g., a flash memory, a magnetic memory, and/or an optical memory).

Storage component 440 stores information and/or software related to the operation of device 400. For example, storage component 440 may include a hard disk drive, a magnetic disk drive, an optical disk drive, a solid state disk drive, a compact disc, a digital versatile disc, and/or another type of non-transitory computer-readable medium. Input component 450 enables device 400 to receive input, such as user input and/or sensed inputs. For example, input component 450 may include a touch screen, a keyboard, a keypad, a mouse, a button, a microphone, a switch, a sensor, a global positioning system component, an accelerometer, a gyroscope, an actuator, and/or the like. Output component 460 enables device 400 to provide output, such as via a display, a speaker, and/or one or more light-emitting diodes. Communication component 470 enables device 400 to communicate with other devices, such as via a wired connection and/or a wireless connection. For example, communication component 470 may include a receiver, a transmitter, a transceiver, a modem, a network interface card, an antenna, and/or the like.

Device 400 may perform one or more processes described herein. For example, a non-transitory computer-readable medium (e.g., memory 430 and/or storage component 440) may store a set of instructions (e.g., one or more instructions, code, software code, program code, and/or the like) for execution by processor 420. Processor 420 may execute the set of instructions to perform one or more processes described herein. In some implementations, execution of the set of instructions, by one or more processors 420, causes the one or more processors 420 and/or the device 400 to perform one or more processes described herein. In some implementations, hardwired circuitry may be used instead of or in combination with the instructions to perform one or more processes described herein. Thus, implementations described herein are not limited to any specific combination of hardware circuitry and software.

The number and arrangement of components shown in FIG. 4 are provided as an example. Device 400 may include additional components, fewer components, different components, or differently arranged components than those shown in FIG. 4. Additionally, or alternatively, a set of components (e.g., one or more components) of device 400 may perform one or more functions described as being performed by another set of components of device 400.

Figure 5:
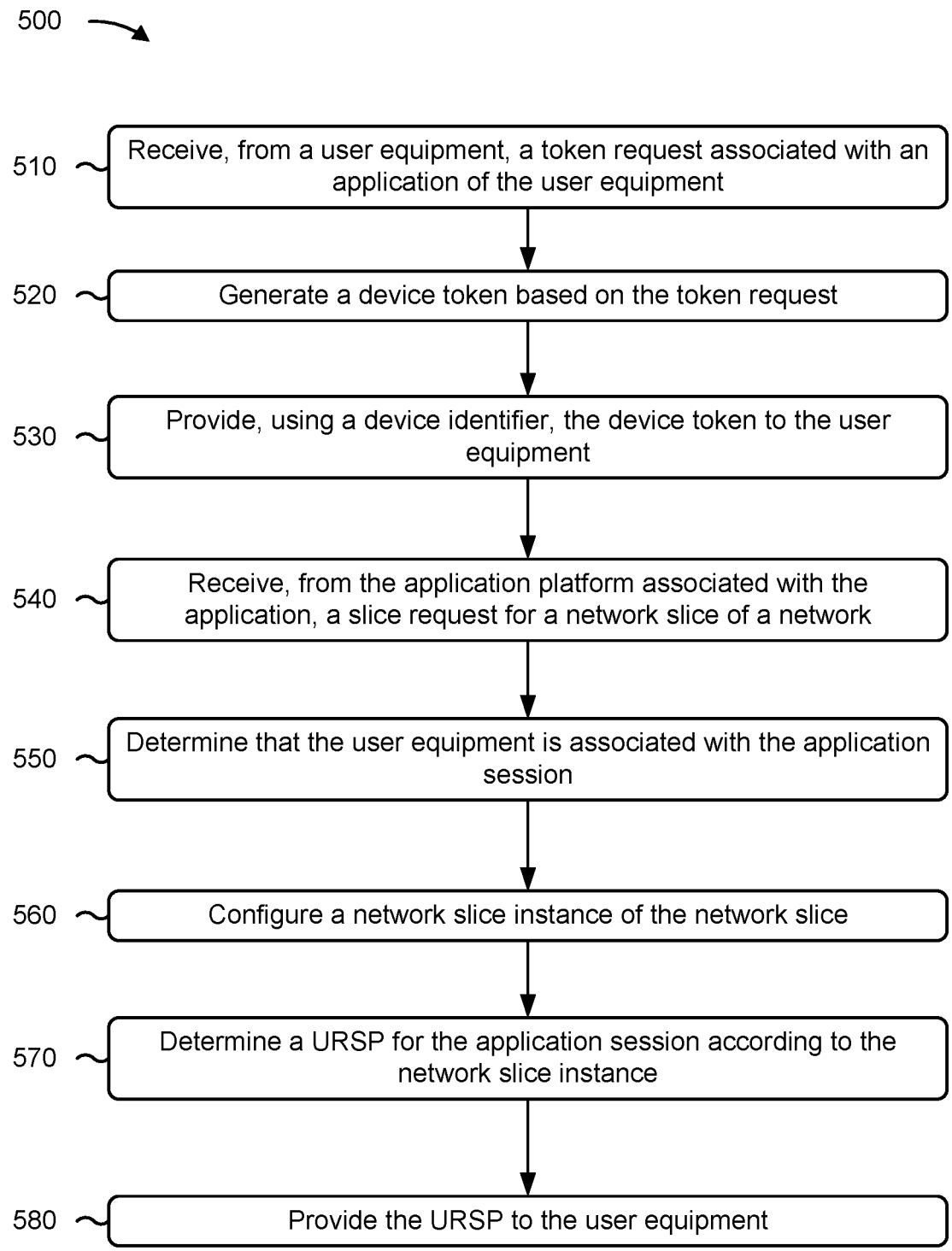
FIG. 5 is a flow chart of an example process relating to user-specific slice configuration for an application.

FIG. 5 is a flow chart of an example process 500 associated with systems and methods for user-specific slice configuration for an application. In some implementations, one or more process blocks of FIG. 5 may be performed by a device (e.g., management system 105). In some implementations, one or more process blocks of FIG. 5 may be performed by another device or a group of devices separate from or including the device, such as a UE (e.g., UE 101), an application platform (e.g., application platform 103), a base station (e.g., base station 242), a NSSF (e.g., NSSF 304), an AUSF (e.g., AUSF 306), a UDM (e.g., a UDM 308), a NRF (e.g., NRF 310), a NEF (e.g., NEF 312), an AF (e.g., AF 314), an AMF (e.g., AMF 316), a PCF (e.g., PCF 318), a UDSF (e.g., UDSF 320), a SMF (e.g., SMF 322), a UPF (e.g., UPF 324), and/or the like. Additionally, or alternatively, one or more process blocks of FIG. 5 may be performed by one or more components of a device 400, such as processor 420, memory 430, storage component 440, input component 450, output component 460, communication component 470, and/or the like.

As shown in FIG. 5, process 500 may include receiving, from a user equipment, a token request associated with an application of the user equipment (block 510). For example, the device may receive, from a user equipment, a token request associated with an application of the user equipment, as described above. In some implementations, the token request is associated with a device identifier associated with the user equipment.

As further shown in FIG. 5, process 500 may include generating a device token based on the token request (block 520). For example, the device may generate a device token based on the token request, as described above. In some implementations, the device token is generated based on determining that the user equipment is authorized to communicate via the network.

As further shown in FIG. 5, process 500 may include providing, using the device identifier, the device token to the user equipment (block 530). For example, the device may provide, using the device identifier, the device token to the user equipment to enable a user to access the application via an application platform, as described above. The device token may be generated and provided to the user equipment based on the token request including a device identifier of the user equipment.

As further shown in FIG. 5, process 500 may include receiving, from the application platform associated with the application, a slice request for a network slice of a network (block 540). For example, the device may receive, from the application platform associated with the application, a slice request for a network slice of a network that is to be used for an application session associated with the application and the user, as described above. In some implementations, the slice request includes the device token and a slice identifier associated with the network slice.

In some implementations, the slice request includes a user identifier of the user that accessed the application, and the network slice instance is configured based on verifying that the user identifier is mapped to the slice identifier. Alternatively, and/or additionally, the slice request includes an application identifier of the application, and the URSP includes the application identifier to permit the user equipment to establish the application session via a data network name of an access point of the network and a S-NSSAI associated with the network slice instance, the data network name and the S-NSSAI are associated with a matching URSP policy configured within a modem of the user equipment.

In some implementations, the device identifier includes at least one of: a directory number, an international mobile subscriber identity number, or an international mobile equipment identity number. Alternatively, and/or additionally, the device identifier may include device information that includes at least one of location information identifying a location of the user equipment, or a data network name associated with an access point of the network that was used to receive the token request.

As further shown in FIG. 5, process 500 may include determining that the user equipment is associated with the application session (block 550). For example, the device may determine that the user equipment is associated with the application session based on the device token being generated in association with the device identifier, as described above. The application session may be determined to be associated with the user equipment based on the device token being mapped to a device identifier of the user equipment when the device token was generated.

As further shown in FIG. 5, process 500 may include configuring a network slice instance of the network slice (block 560). For example, the device may configure a network slice instance of the network slice based on the slice identifier and the user equipment being associated with the application session, as described above. In some implementations, the network slice instance is configured to provide a network service level, for the application session, that corresponds to a subscription type of the application, the slice request is received based on the user being subscribed to receive the subscription type. For example, the user may be subscribed to a subscription level associated with the application and the network slice instance may be configured to provide a network service level that is associated with the subscription level.

In some implementations, process 500 may include validating that the network slice instance can be configured by verifying, based on the device token, that the slice request is associated with the user equipment, and verifying, based on the application identifier, that the application platform is authorized to request network slice instances. The slice request may include an application identifier associated with the application and the network slice instance may be configured based on a verification that the application platform is authorized to request the network slice according to a mapping that includes the application identifier.

As further shown in FIG. 5, process 500 may include determining a user equipment route selection policy (URSP) for the application session according to the network slice instance (block 570). For example, the device may determine a user equipment route selection policy (URSP) for the application session according to the network slice instance, as described above. The URSP may be provided to the user equipment using the device identifier.

As further shown in FIG. 5, process 500 may include providing the URSP to the user equipment (block 580). For example, the device may provide the URSP to the user equipment to permit the user equipment to establish, using the network slice instance, the application session for the user, as described above. The slice information may be provided in association with the USRP for the application session. The USRP may include the application identifier to permit the user equipment to establish the application session using resources of the network that are identified by the slice information.

Process 500 may include receiving, from the user equipment, a session request to establish the application session, and instantiating the network slice instance using resources of the network that are associated with a data network name and a S-NSSAI associated with the network slice instance. The data network name and the S-NSSAI may be included in the session request.

Alternatively, and/or additionally, process 500 may include receiving, from the user equipment, a session request to establish the application session, and instantiating, based on receiving the session request to establish the application session, the network slice using resources of the network that are associated with the slice information.

Process 500 may include managing the application session in association with the user identifier.

Although FIG. 5 shows example blocks of process 500, in some implementations, process 500 may include additional blocks, fewer blocks, different blocks, or differently arranged blocks than those depicted in FIG. 5. Additionally, or alternatively, two or more of the blocks of process 500 may be performed in parallel.

The foregoing disclosure provides illustration and description, but is not intended to be exhaustive or to limit the implementations to the precise form disclosed. Modifications and variations may be made in light of the above disclosure or may be acquired from practice of the implementations.

As used herein, the term "component" is intended to be broadly construed as hardware, firmware, or a combination of hardware and software.

To the extent the aforementioned implementations collect, store, or employ personal information of individuals, it should be understood that such information shall be used in accordance with all applicable laws concerning protection of personal information. Additionally, the collection, storage, and use of such information can be subject to consent of the individual to such activity, for example, through well known "opt-in" or "opt-out" processes as can be appropriate for the situation and type of information. Storage and use of personal information can be in an appropriately secure manner reflective of the type of information, for example, through various encryption and anonymization techniques for particularly sensitive information.

It will be apparent that systems and/or methods described herein may be implemented in different forms of hardware, firmware, and/or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware can be used to implement the systems and/or methods based on the description herein.

Even though particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, a combination of related and unrelated items, etc.), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A method, comprising:
   receiving, by a device and from a user equipment, a token request;
   generating, by the device, a device token based on the token request;
   providing, using a device identifier, the device token to the user equipment to enable a user to access an application;
   receiving, by the device and from an application platform, a slice request for a network slice of a network, that includes the device token and a slice identifier associated with the network slice;
   determining, by the device, that the user equipment is associated with an application session; and
   configuring, by the device, a network slice instance of the network slice based on the slice identifier and the user equipment being associated with the application session.

2. The method of claim 1, further comprising:
   determining a user equipment route selection policy (URSP) for the application session according to the network slice instance; and
   providing the URSP to the user equipment to permit the user equipment to establish, using the network slice instance, the application session for the user.

3. The method of claim 1, wherein the slice request includes a user identifier of the user, and
   wherein the network slice instance is configured based on verifying that the user identifier is mapped to the slice identifier.

4. The method of claim 1, wherein the device identifier includes at least one of:
   a directory number,
   an international mobile subscriber identity number, or
   an international mobile equipment identity number.

5. The method of claim 1, wherein the network slice instance is configured to provide a network service level, for the application session, that corresponds to a subscription type of the application associated with the user.

6. The method of claim 2, wherein the slice request includes an application identifier of the application, and
   wherein the URSP includes the application identifier to permit the user equipment to establish the application session via a data network name of an access point of the network and a single network slice selection assistance information (S-NSSAI) associated with the network slice instance,
wherein the data network name and the S-NSSAI are associated with a matching URSP policy configured within a modem of the user equipment.

7. The method of claim 2, wherein the URSP is provided to the user equipment using the device identifier.

8. A device, comprising:
one or more processors configured to:
provide, based on receiving a token request associated with an application of a user equipment, a device token to the user equipment,
wherein the device token is configured to be provided by the user equipment to an application platform of the application in association with a user accessing the application;
receive, from the application platform associated with the application and after the user accessed the application, a slice request for a network slice of a network that is to be used for an application session associated with the application and the user,
wherein the slice request includes the device token, an application identifier of the application, and a slice identifier associated with the network slice;
validate, based on the application identifier and the device token, that a network slice instance of the network slice can be configured for the application;
configure, based on validating that the network slice instance can be configured, the network slice instance of the network slice based on the slice identifier and device information associated with the user equipment; and
provide, to the user equipment, slice information that is associated with the network slice instance to permit the user equipment to establish the application session via the network using the network slice instance.

9. The device of claim 8, wherein the device token is generated and provided to the user equipment based on the token request including a device identifier of the user equipment.

10. The device of claim 8, wherein the slice request identifies a user identifier of the user, and
wherein the one or more processors are further to manage the application session in association with the user identifier.

11. The device of claim 8, wherein the one or more processors, when validating that the network slice instance can be configured, are configured to:
verify, based on the device token, that the slice request is associated with the user equipment; and
verify, based on the application identifier, that the application platform is authorized to request network slice instances.

12. The device of claim 8, wherein the device information includes at least one of:
location information identifying a location of the user equipment, or
a data network name associated with an access point of the network that was used to receive the token request.

13. The device of claim 8, wherein the slice information is provided in association with a user equipment route selection policy (URSP) for the application session,
wherein the URSP includes the application identifier to permit the user equipment to establish the application session using resources of the network that are identified by the slice information.

14. The device of claim 8, wherein the one or more processors are further to:
receive, from the user equipment, a session request to establish the application session,
wherein the session request includes a data network name and single network slice assistance information (S-NSSAI) associated with the network slice instance; and
instantiate the network slice instance using resources of the network that are associated with the data network name and the S-NSSAI.

15. A non-transitory computer-readable medium storing instructions, the instructions comprising:
one or more instructions that, when executed by one or more processors of a device, cause the device to:
receive, from an application platform associated with an application, a slice request for a network slice of a network,
wherein the network slice is to be used for an application session associated with the application and a user, and
wherein the slice request includes a device token and a slice identifier associated with the network slice;
determine, based on the device token, that the application session is associated with a user equipment that is associated with the device token;
configure a network slice instance of the network slice based on the slice identifier and the user equipment being associated with the application session; and
provide, to the user equipment, slice information associated with the network slice instance to enable the application session to be established using the network slice instance.

16. The non-transitory computer-readable medium of claim 15, wherein the user equipment is associated with the device token based on the device token being generated in association with a token request from the user equipment.

17. The non-transitory computer-readable medium of claim 15, wherein the application session is determined to be associated with the user equipment based on the device token being mapped to a device identifier of the user equipment when the device token was generated.

18. The non-transitory computer-readable medium of claim 15, wherein the slice request includes an application identifier associated with the application, and
wherein the network slice instance is configured based on a verification that the application platform is authorized to request the network slice according to a mapping that includes the application identifier.

19. The non-transitory computer-readable medium of claim 15, wherein the user is subscribed to a subscription level associated with the application, and
wherein the network slice instance is configured to provide a network service level that is associated with the subscription level.

20. The non-transitory computer-readable medium of claim 15, wherein the one or more instructions, when executed by the one or more processors, further cause the one or more processors to:
receive, from the user equipment, a session request to establish the application session; and
instantiate, based on receiving the session request to establish the application session, the network slice using resources of the network that are associated with the slice information.

* * * * *